United States Patent
Nakanishi et al.

(10) Patent No.: US 12,147,822 B2
(45) Date of Patent: Nov. 19, 2024

(54) MULTI-MODAL APPROACH TO PROVIDING A VIRTUAL COMPANION SYSTEM

(71) Applicant: Thomson Licensing, Cesson-Sevigne (FR)

(72) Inventors: Gregory N. Nakanishi, San Diego, CA (US); Gonzaga Chow, Duluth, GA (US)

(73) Assignee: Thomson Licensing, Cesson-Sevigne (FR)

( * ) Notice: Subject to any disclaimer, the term of this patent is extended or adjusted under 35 U.S.C. 154(b) by 0 days.

(21) Appl. No.: 18/115,960

(22) Filed: Mar. 1, 2023

(65) Prior Publication Data
US 2024/0296058 A1   Sep. 5, 2024

(51) Int. Cl.
*G06F 9/451*    (2018.01)
*H04L 51/02*    (2022.01)
*H04M 1/72436*  (2021.01)

(52) U.S. Cl.
CPC .............. *G06F 9/453* (2018.02); *H04L 51/02* (2013.01); *H04M 1/72436* (2021.01)

(58) Field of Classification Search
CPC ..... G06F 9/453; H04L 51/02; H04M 1/72436
See application file for complete search history.

(56) References Cited

U.S. PATENT DOCUMENTS 7,177,904 B1 *   2/2007  Mathur ............... G06F 21/6245
                                             709/204
2011/0214153 A1   9/2011  Rosenfeld
2012/0116556 A1 * 5/2012  Luciano, Jr. ........ G07F 17/3211
                                              700/91
2016/0125145 A1   5/2016  Kim et al.
(Continued)

FOREIGN PATENT DOCUMENTS

WO    2011/127706    10/2011

OTHER PUBLICATIONS

International Search Report and The Written Opinion of the International Searching Authority dated Dec. 20, 2021 in International (PCT) Application No. PCT/US2021/051634.
(Continued)

*Primary Examiner* — Seth A Silverman
(74) *Attorney, Agent, or Firm* — Vincent Edward Duffy

(57) ABSTRACT

An intelligent notification system/virtual companion system provides an intelligent notification to a client device associated with a user so as to improve the quality of service to a user. Rather than send a user monotonous or routine reminders that do not reflect current or timely information, the intelligent notification/interaction is based on user data associated with the user. By aggregating user data associated with a schedule of the user, the intelligent notification/interaction system can generate an intelligent notification that provides information to the user that is useful and pertinent. For example, a user may have already completed a regularly schedule and as such no reminder is necessary. The intelligent notification/interaction can, in lieu of a reminder, send the user a encouraging or informative intelligent reminder. In this way, a user is not inundated with stale reminders but rather receives accurate, relevant and information intelligent notifications and interactions.

20 Claims, 9 Drawing Sheets

(56) References Cited

U.S. PATENT DOCUMENTS

| | | | |
|---|---|---|---|
| 2019/0065027 A1* | 2/2019 | Hauenstein | G06F 3/04883 |
| 2019/0158658 A1 | 5/2019 | Gebers et al. | |
| 2019/0188895 A1* | 6/2019 | Miller, IV | G06T 13/40 |
| 2019/0318283 A1 | 10/2019 | Kelly et al. | |
| 2019/0378611 A1 | 12/2019 | Kim et al. | |
| 2020/0201529 A1 | 6/2020 | McLean | |
| 2021/0250177 A1 | 8/2021 | Yoo | |
| 2022/0245141 A1* | 8/2022 | Aggarwal | G06N 3/006 |
| 2023/0139626 A1* | 5/2023 | Berliner | G06F 1/1694 |
| | | | 345/156 |

OTHER PUBLICATIONS

Ji Eun Kim et al : "Seamless Integration of Heterogeneous Devices and Access Control in Smart Homes", Intelligent Environments (IE), 2012 8th International Conference on, IEEE, Jun. 26, 2012 (Jun. 26, 2012), pp. 206-213, XP032218223.

Busnel Pierre et al: "An XACML-based Security Pattern to achieve Socio-Technical Confidentiality in Smart Homes", International Journal of Smart Home, Jan. 31, 2009 (Jan. 31, 2009), XP055871100, Retrieved from the Internet: URL:https://www.researchgate.net/profile/Sylvain Giroux/publication/255571422_An_XACMLbased_Security_Pattern_to_achieve_Socio-Technical_Confidentiality_in_Smart_Homes/links/546dfbd70cf29806ec2e651f/An-XACML-based Security-Pattern-to-achieve-Socio-Technical Confidentiality-in-Smart-Homes .pdf.

Lili Sun et al : "Semantic access control for cloud computing based on e-Healthcare", Computer Supported Cooperative Work in Design (CSCWD), 2012 IEEE 16th International Conference on, IEEE, May 23, 2012 (May 23, 2012), pp. 512-518, XP032189381.

Raad M W et al: "A ubiquitous smart home for elderly", Information Systems Frontiers ; A Journal of Research and Innovation, Kluwer Academic Publishers, BO, vol. 11, No. 5, Jul. 12, 2008 (Jul. 12, 2008), pp. 529-536, XP019769731.

International Preliminary Report on Patentability dated Feb. 7, 2023 in International (PCT) Application No. PCT/US2021/044939.

International Search Report and the Written Opinion of the International Searching Authority dated Oct. 27, 2021 in International (PCT) Application No. PCT/US2021/044939.

* cited by examiner

| User Identifier 260 | | | | |
|---|---|---|---|---|
| Task 503 | Task Instruction 505 | Schedule 507 | Video Intelligent Notification 509 | Additional Video Intelligent Notification 511 |
| Prescription #1 | Dosage #1 | Schedule #1 | Recording A, Recording B | Recording F |
| Prescription #2 | Dosage #2 | Schedule #2 | Recording C, | Recording F |
| Prescription #3 | Dosage #3 | Schedule #3 | Recording D, Recording B | Recording G |
| Prescription #4 | Dosage #4 | Schedule #1 | Recording E | Recording H |
| <New Task> | <New Task Instruction> | <New Scheduled Notification> | <New Video Notification> | <New Additional Video Notification> |

FIG. 5D

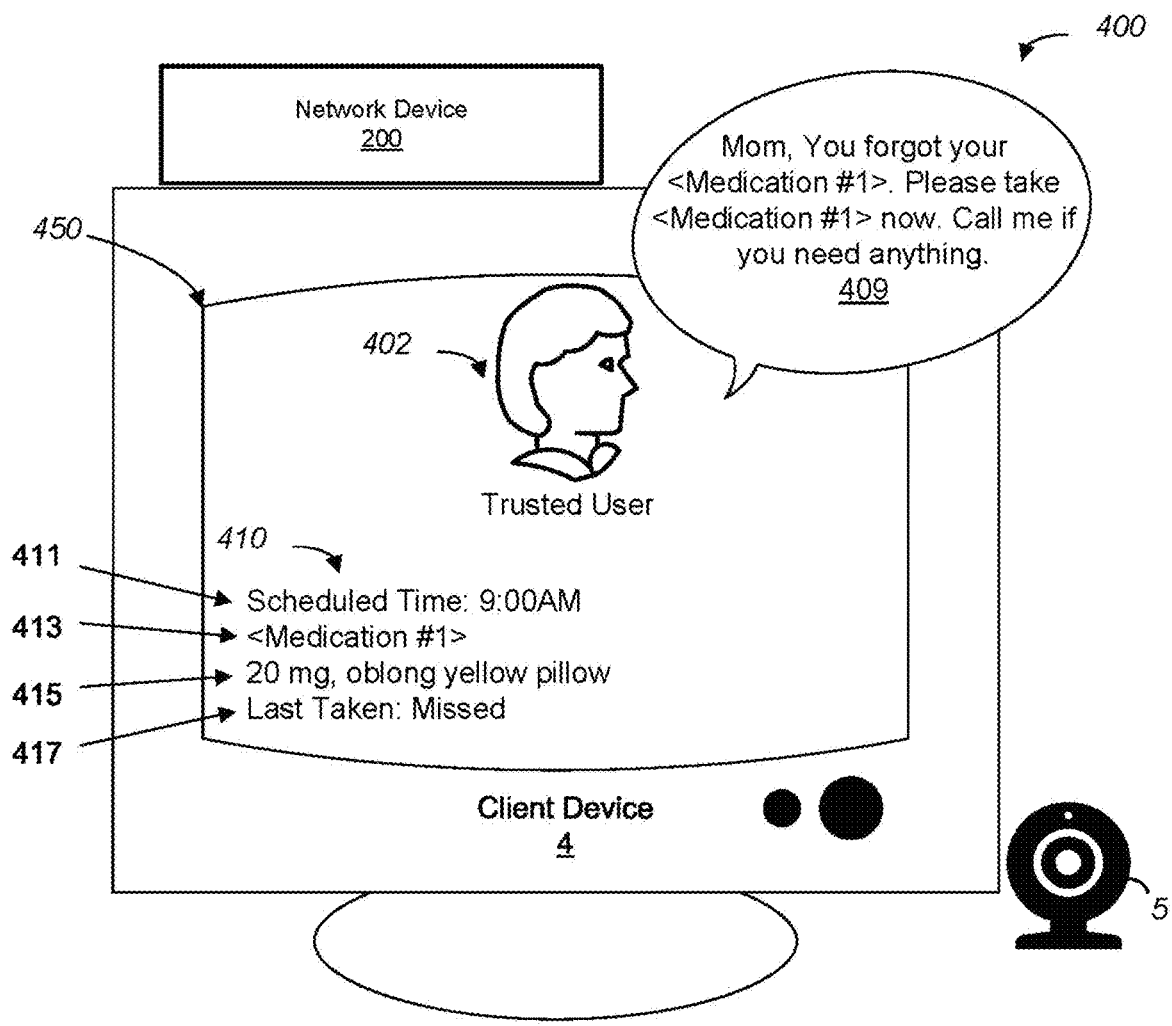

FIG. 4

| User Identifier 260 | | | | | |
|---|---|---|---|---|---|
| User Profile 502 | Profile Description 504 | Access Parameters 506 | Device Identifier 508 | Encrypted Credential 510 | Pre-Auth. Access 512 |

FIG. 5A

| User Identifier 260 | | | | | | | | |
|---|---|---|---|---|---|---|---|---|
| User Profile 502 | Profile Description 504 | Access Parameters 506 | | | | | | |
| | | Video Call | Camera Data | Diagnostic Data | Sensor Data | Activity Data | Intelligent Notification | Pre-Auth. |
| Primary Contact | Family Friend Guardian | Yes | Yes | No | Yes | Yes | Yes | Yes |
| Caregiver | Personal Staff/Nurse | Yes | Yes | Yes | Yes | Yes | Yes | 512 |
| Healthcare Prof. | Doctor(s) | Yes | Yes | Yes | Yes | Yes | Yes | Yes |
| Coordinator | Care Admin. | Yes | No | No | Yes | No | Yes | No |
| Personal Services | General Staff | No | No | No | No | No | No | No |
| Auth. Consent Provider | Super User(s)/ Registered Service | Yes | Yes | Yes | Yes | Yes | Yes | Yes |

FIG. 5B

| User Identifier 260 | | | |
|---|---|---|---|
| User Profile 502 | Device Identifier 508 | Encrypted Credentials 510 | Pre-Auth. Access 512 |
| Primary Contact | <Device Name> | <...> | <Auth. Code> |
| Caregiver | Mobile App | <...> | <date>/<time> |
| Healthcare Prof. | Portal | <...> | <Anytime> |
| Coordinator | Mobile App | <...> | <date>/<time? |
| Personal Services | Mobile App | <...> | None |
| Auth. Consent Provider | Mobile App < Device Name> Portal | <...> | <Anytime> |

FIG. 5C

MULTI-MODAL APPROACH TO PROVIDING A VIRTUAL COMPANION SYSTEM

BACKGROUND

Wireless in general, and Wi-Fi (wireless fidelity) in particular have become ubiquitous in networking environments such that many devices that previously relied on manual readouts and displays also provide the same information over wireless technologies. This is even more important as there is a concomitant availability of software applications that run on wireless devices (such as mobile phones) that can read the data and provide useful information to the end-user, for example, via a mobile application. For example, as healthcare costs continue to increase, there is an increasing desire with aging adults to stay in place (in home) for extended care services. While there are many individual technologies to address niche problems, given the rapid rise of connectivity technologies and the use of Artificial Intelligence (AI) techniques for predictive and analytical methods, these technologies can be monotonous, untailored, overly generic, confusing and difficult to configure making ubiquitous adoption of a particular technology unlikely. For example, a companionship functionality is missing which decreases the effectiveness of such techniques. Additionally, instructions for and compliance with a schedule (or a regimen) are difficult to administer. Thus, there is a need for a more robust notification and interaction system to ensure compliance with a schedule while not burdening a user and to provide companionship so as to improve the overall user experience.

SUMMARY

Compliance with a schedule (such as a regimen), for example, a schedule of activities and/or instructions, such as any of a wellness regimen, a health regimen, a periodic regimen, an instructional regimen, any other regimen, or any combination thereof can be difficult given that the need for repetitive reminders can be seen by the user as confusing, annoying, disruptive, redundant and/or otherwise bothersome for a user. Additionally, the schedule does not generally consider a companionship aspect that not only increases compliance with the schedule but also provides mental stimulation, such as by providing compassionate care through meaningful user interaction. In spite of advances in technology, on-site/at-home interactivity and/or scheduling systems suffer from declining use over time, for example, due to monotony, inaccuracies, desensitization, and/or any other issue. That is, the efficacy of such interactive systems and scheduling systems can lose efficacy offer time. According to aspects of the present disclosure there are provided novel solutions for a multi-modal portal system, such as an interactive virtual companion system and/or a scheduling system, to provide intelligent or rich interactions and/or notifications that are utilized by one or more applications to primarily inform and engage a user, with little to no requirement for active interaction by the user. A multi-modal approach allows a remote user, such as a trusted user or supporter, to send a notification and/or interact virtually and/or cause a virtual interaction to an associated user that provides one or more timely, accurate, relevant, and/or informative messages.

A novel solution provides for a multi-modal portal system that comprises an intelligent notification system (also referred to as rich notification system) so that a trusted user or supporter can interact with a user associated with the trusted user or supporter. The multi-modal portal system uses a variety of modes including different sensing devices for any of motion detection, sound identification detection, voice detection, video conferencing, input/output systems (such as any of a camera, a transmitter (such as a speaker), a receiver (such as a microphone), etc.), a smart device, a biomedical device, a diagnostic device, any other sensor, or any combination thereof. The multi-modal portal system receives data from any one or more sensing devices, aggregates the data, and sends the data to an intelligent notification system, such as at a network device, a network resource (such as a cloud server), or both, can utilize the data to provide an intelligent notification that is more informative than a generic notification.

A novel solution provides for an intelligent virtual companion system that provides for interaction between an associated user, such as a client user, and a virtual user based on user data. The virtual user can be any of associated with a contact or trusted user as designated by a profile configuration associated with the user, a virtual companion (such as an avatar), any other remote user, or any combination thereof. The virtual user can provide a interactive communication with the user in real-time based on user data received form one or more network devices associated with the user, such as one or more sensing devices and/or one or more client devices. In this way, the user is engaged with the virtual user in a meaningful way so as to increase the effectiveness of a service to the user, such as a compassionate care service associated with the user, for example, ensuring compliance with a schedule associated with the user.

As an example, a generic notification regarding a schedule (such as a healthcare regimen that comprises a dosage of a medicine) can be sent to a user on a periodic basis based on the schedule. Such a notification does not account for any intervening or received data. The intelligent notification system utilizes aggregated data from one or more sensing devices associated with the user to generate an intelligent notification that overcomes the shortcomings of static or generic notifications. For example, the intelligent notification system can track an event associated with an notification, such as an event that is indicative that a particular task has been completed (such as the user has taken the required dosage). Then if the task has been completed, the intelligent notification system does not send the notification. The intelligent notification system can send a different or another type of notification. Instead of sending a notification that is a reminder regarding the dosage (that has already been taken), the intelligent notification system sends, for example, any of a completion notification that is an affirmation that the dosage has been completed, a supportive notification that comprises an encouraging message, any other notification that provides relevant information associated with the completion of the dosage, or any combination thereof. The intelligent notification system can provide one or more follow-up notifications associated with the schedule so as to inform persistently and automatically the user without overburdening the user with stale or inaccurate information.

As an example, a virtual user can be associated with a user, for example, as part of a profile configuration. The virtual user, for example, can be represented as an avatar. The virtual user can be utilized to provide compassionate care, such as to reduce loneliness, to promote adherence to a schedule, etc. One or more virtual users can be associated with one or more personalities. Each of the one or more personalities can be associated with one or more types of interactions. For example, a first virtual user can be a first avatar associated with a first personality, such as a medical professional, that is associated with a first type of interaction, such as a medical examination, while a second virtual user can be a second avatar for a second personality associated with a second personality, such as a family member, that is associated with a second type of interaction, such as a familial conversation. In this way, the user interacts with one or more virtual users so as to reduce the monotony of generic communications and to enhance or improve the overall user experience.

An aspect of the present disclosure provides a virtual companion system (VCS) for providing an interaction between a virtual user and a user. The VCS comprises a memory storing one or more computer-readable instructions and a processor configured to execute the one or more computer-readable instruction to receive user data from one or more sources associated with the user, select a virtual user associated with the user based on the user data, and provide the interaction between the virtual user and the user based on the user data.

In an aspect of the present disclosure, the processor is further configured to execute the one or more instructions to determine a personality associated with the virtual user based on the user data.

In an aspect of the present disclosure, the processor is further configured to execute the one or more instructions to determine an interaction type associated with the personality based on the user data.

In an aspect of the present disclosure, the processor is further configured to execute the one or more instructions to at least one of to a trusted user associated with the user based on the interaction and send a prompt to the user to initiate the interaction.

In an aspect of the present disclosure, the processor is further configured to execute the one or more instructions to receive a response from the user based on the interaction, and generate one or more outputs of the interaction for communication to the user via the virtual user based on the response.

In an aspect of the present disclosure, wherein the virtual user is an avatar associated with a user profile, wherein the user profile is associated with the user.

In an aspect of the present disclosure, wherein the interaction comprises a natural language communication based on artificial intelligence system.

An aspect of the present disclosure provides a method for providing by a virtual companion system (VCS) an interaction between a virtual user and a user. The method comprises receiving user data from one or more sources associated with the user, selecting a virtual user associated with the user based on the user data, and providing the interaction between the virtual user and the user based on the user data.

In an aspect of the present disclosure, the method further comprises determining a personality associated with the virtual user based on the user data.

In an aspect of the present disclosure, the method further comprises determining an interaction type associated with the personality based on the user data.

In an aspect of the present disclosure, the method further comprises sending an update to a trusted user associated with the user based on the interaction, and sending a prompt to the user to initiate the interaction.

In an aspect of the present disclosure, the method further comprises receiving a response from the user based on the interaction, and generating one or more outputs of the interaction for communication to the user via the virtual user based on the response.

In an aspect of the present disclosure, the method such that the virtual user is an avatar associated with a user profile, wherein the user profile is associated with the user.

In an aspect of the present disclosure, the method such that the interaction comprises a natural language communication based on artificial intelligence system.

An aspect of the present disclosure provides a non-transitory computer-readable medium of a virtual companion system (VCS) storing one or more instructions providing an interaction between a virtual user and a user. The one or more instructions when executed by a processor of the VCS, cause the VCS to perform one or more operations including the steps of the methods described above.

Thus, according to various aspects of the present disclosure described herein, it is possible to manage and control intelligent notifications for a user. The novel solution(s) provide a multi-modal portal system that aggregates information, user data from one or more sensing devices, for use by, for example, an intelligent notification system. In this way, a user is provided with timely, relevant, informative, current, accurate, non-invasive, non-duplicative, and/or reliable notifications associated with a schedule associated with a user. Additionally, the user is also provided, for example, with compassionate care via a virtual companion system that can provide a meaningful interaction with the user, such as by using natural language generated using artificial intelligence.

BRIEF DESCRIPTION OF DRAWINGS

In the drawings, like reference numbers generally indicate identical, functionally similar, and/or structurally similar elements.

FIG. 4 is an illustration of an example intelligent notification to a user, according to one or more aspects of the present disclosure;

FIGS. 5A, 5B, 5C, and 5D are exemplary aspects of a profile configuration associated with a user, according to one or more aspects of the present disclosure;

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
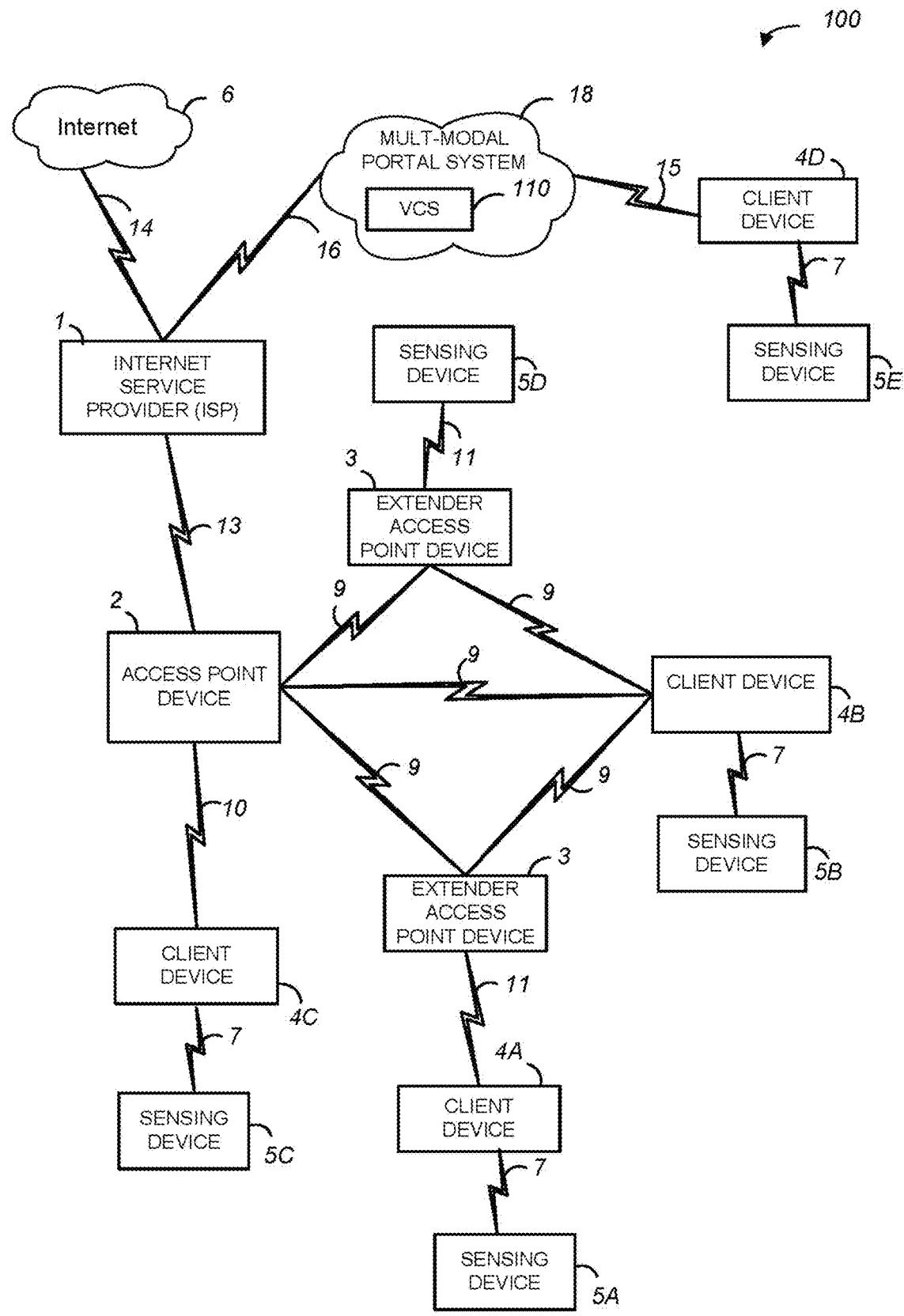
FIG. 1 is a schematic diagram of a network environment, according to one or more aspects of the present disclosure.

FIG. 1 is a schematic diagram of a network environment 100, according to one or more aspects of the present disclosure. For example, a secure, multi-modal, multi-protocol monitoring and communication network environment can provide for aggregation of user data from multiple network devices and/or sources and/or a virtual companion system for intelligent interactions with a user. An example network environment can be related to a caregiving, biometric, and/or diagnostic network for a user (for example, an individual associated with a caregiving service, such as an aging-in-place service) such that one or more aspects associated with the user (for example, any user data associated with a sensing device 5, such as biometric data, a visual interface, etc.) can be aggregated and/or monitored from multiple network devices capable of sensing the one or more aspects. For example, any one or more trusted users or supporters, such as in a trusted support network, can access data associated with a user (user data) and provide instructions for one or more intelligent notifications to be sent to a client device 4 associated with a user and/or a virtual user to engage the user in an interaction. Access to the aggregated and/or monitored data along with one or more other access parameters, including the one or more intelligent notifications, can be controlled based on one or more profile configurations as discussed with reference to FIGS. 5A-5D.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

A network environment 100 can comprise an access point device 2 connected to a network resource such as any of the Internet 6, a multi-modal portal system 18, any other cloud storage/repository, or any combination thereof via an Internet Service Provider (ISP) 1 and also connected to different wireless devices or network devices such as one or more wireless extender access point devices 3, one or more client devices 4A-4D (collectively referred to as client device(s) 4), and one or more sensing devices 5A-5E (collectively referred to as sensing device(s) 5). The network environment 100 shown in FIG. 1 includes wireless network devices (for example, sensing devices 5 extender access point devices 3 and client devices 4) that may be connected in one or more wireless networks (e.g., private, guest, iControl, backhaul network, or Internet of things (IoT) network) within the network environment 100. Additionally, there could be some overlap between wireless devices (for example, sensing devices 5, extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 can be, for example, a content provider or any computer for connecting the access point device 2 to a network resource, such as Internet 6 and multi-modal portal system 18. For example, Internet 6 can be a cloud-based service that provides access to a cloud-based repository accessible via ISP 1 where the cloud-based repository comprises information associated with or an access requested by any one or more network devices of the network environment 100. The multi-modal portal system 18 can comprise a virtual companion system (VCS) 110 that provides for an intelligent interaction between a user and a virtual user, for example, to engage the user in a meaningful way so as to improve the overall experience for the user (for example, to encourage participation and adherence with an associated schedule and/or to provide compassionate care through personalized interactions). While FIG. 1 shows VCS 110 as part of or within a multi-modal portal system 18, the present disclosure contemplates that the VCS 110 can be any network device within the network environment 100, for example, as part of or within a client device 4 (such as a set-top box). The multi-modal portal system 18 can provide monitoring, aggregation and/or controlling of data associated with a user (or user data) in the network environment 100, such as data collected by one or more sensing devices 5, so as to provide one or more intelligent notifications to a user. In one or more embodiments, the multi-modal portal system 18 can communicate with any one or more external repositories of Internet 6 via ISP 1 or internal repositories, such as a notification repository. In one or more embodiments, any of the sensing devices 5 can be directly or indirectly coupled to the multi-modal portal system 18. The connection 14 between the Internet 6 and the ISP 1, the connection 16 between the multi-modal portal system 18 and the ISP 1, the connection 15 between the multi-modal portal system 18 and the client device 4D, and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

Any of the connections 13, 14, 15, 16, or any combination thereof (collectively referred to as network connections or connections) can further include as some portion thereof a broadband mobile phone network connection, an optical network connection, or other similar connections. For example, any of the network connections can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that any of the network connections are capable of providing connections between a network device and a WAN, a LAN, a VPN, MANs, PANS, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (for example, wireless extender access point devices 3 and client devices 4) in the network environment 100, or any combination thereof. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2 and the wireless extender access point devices 3, and client device 4B can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the extender access point devices 3 and the client device 4A and sensing device 5D are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. Further, a client device 4 can be a network device that requires configuration by the access point device 2. In one or more embodiments, the client devices 4 can comprise any network device associated with a user for interacting with any type of one or more sensing devices 5. For example, the client device 4 can interact with a plurality of sensing devices 5 where each sensing device 5 senses one or more aspects associated with a user or an environment. In one or more embodiments, one or more sensing devices 5 are included within or local to (built-in) the client device 4. Any one or more client devices 4 and/or sensing devices 5 can be associated with a user, a trusted user or supporter, or both.

One or more sensing devices 5 can connect to one or more client devices 4, for example, via a connection 7. Connection 7 can utilize any one or more protocols discussed above with respect to connection 9. Any of the one or more sensing devices 5 can comprise or be coupled to an optical instrument (such as a camera, an image capture device, any other visual user interface device, any device for capturing an image, a video, a multi-media video, or any other type of data, or a combination thereof), a biometric sensor, a biometric tracker or sensor, ambient temperature sensor, a light sensor, a humidity sensor, a motion detector (such as, an infrared motion sensor or Wi-Fi motion sensor), a facial recognition system, a medical diagnostic sensor (such as, a pulse oximeter or any other oxygen saturation sensing system, a blood pressure monitor, a temperature sensor, a glucose monitor, etc.), a voice recognition system, a microphone (such as, a far field voice (FFV) microphone) or other voice capture system, any other input/output (I/O) system, any other sensing device, or any combination thereof.

The connection 10 between the access point device 2 and the client device 4 is implemented through a wireless connection that operates in accordance with, but is not limited to, any IEEE 802.11 protocols. Additionally, the connection 10 between the access point device 2 and the client device 4C can also be implemented through a WAN, a LAN, a VPN, MANS, PANS, WLANs, SANS, a DOCSIS network, a fiber optics network (e.g., FTTH, FTTX, or HFC), a PSDN, a global Telex network, or a 2G, 3G, 4G, 5G or 6G network, for example. The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands. One or more of the connections 10 can also be a wired Ethernet connection. In one or more embodiments, any one or more client devices 4 utilize a protocol different than that of the access point device 2.

Figure 2:
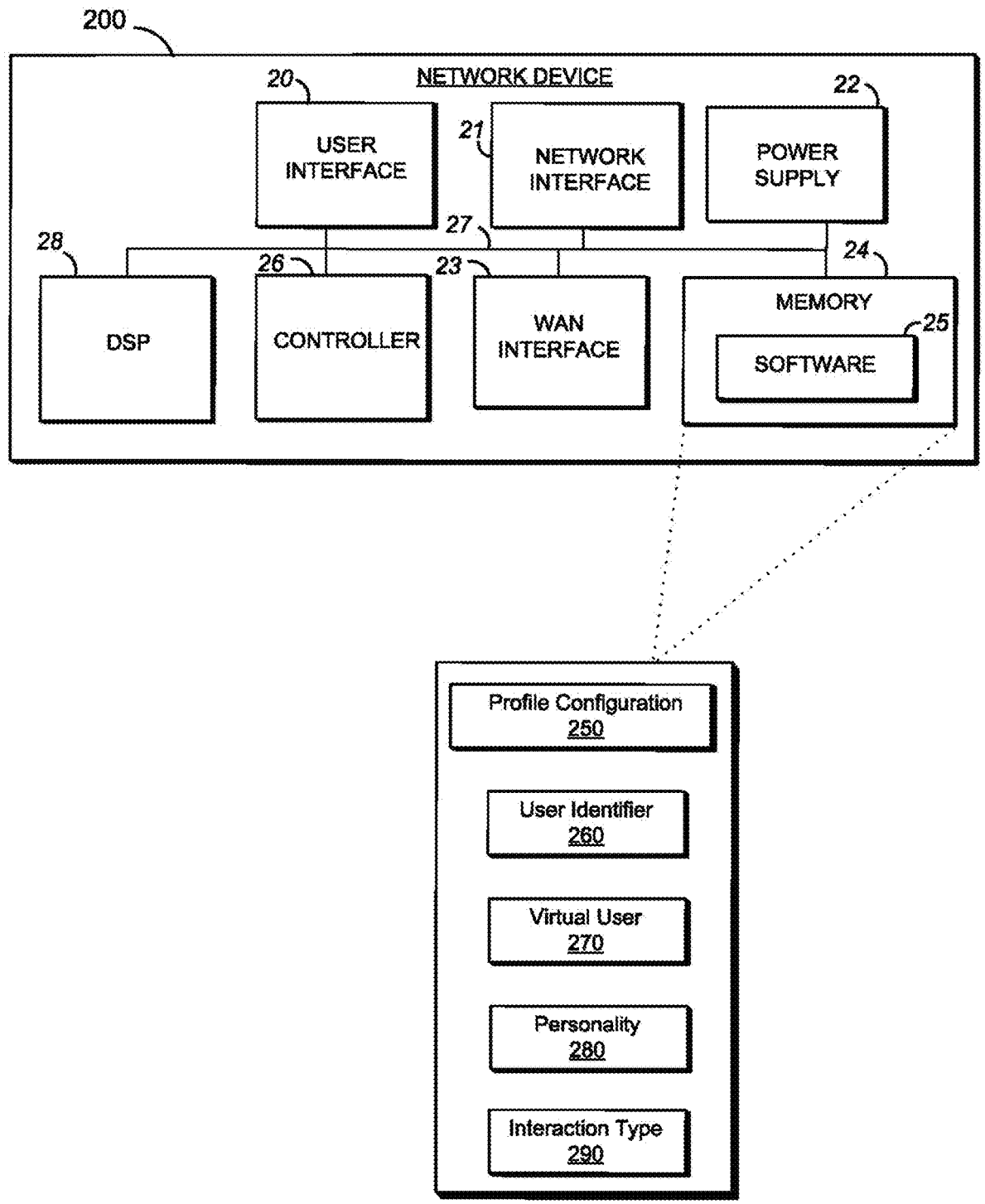
FIG. 2 is a more detailed block diagram illustrating various components of a network device, according to one or more aspects of the present disclosure.

It is contemplated by the present disclosure that the multi-modal portal system 18, the VCS 110, the access point device 2, the extender access point devices 3, and the client devices 4 include electronic components or electronic computing devices, such as a network device 200 of FIG. 2, operable to receive, transmit, process, store, and/or manage data and information associated with the network environment 100, which encompasses any suitable processing device adapted to perform computing tasks consistent with the execution of computer-readable instructions stored in a memory or a computer-readable recording medium (for example, a non-transitory computer-readable medium).

Further, any, all, or some of the computing components in the multi-modal portal system 18, the VCS 110, access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The multi-modal portal system 18, the VCS 110, the access point device 2, the extender access point devices 3, and the client devices 4 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary network device 200, such as a network device comprising any of a multi-modal portal system 18, a VCS 110, an access point device 2, an extender access point device 3, a client device 4, a sensing device 5, any other network device, or any combination thereof implemented in the network environment 100 of FIG. 1, according to one or more aspects of the present disclosure. For example, a multi-modal portal system 18 and/or a VCS 110 can be associated with a trusted user or supporter such that the trusted user or supporter utilizes the multi-modal portal system 18 and/or the VCS 110 to aggregate user data associated with a user and to send one or more intelligent notifications to the user and/or provide an interaction between a virtual user and the user, for example, via a client device 4 associated with the user.

The network device 200 can be, for example, a computer, a server, any other computer device with smart capabilities capable of connecting to the Internet, cellular networks, and interconnecting with other network devices via Wi-Fi and Bluetooth, or other wireless hand-held consumer electronic device capable of providing management and control of user data, for example, a multi-modal portal system 18 and/or a VCS 110, according to one or more aspects of the present disclosure. The network device 200 includes one or more internal components, such as a user interface 20, a network interface 21, a power supply 22, a controller 26, a WAN interface 23, a memory 34, a digital signal processor (DSP) 28, and a bus 27 interconnecting the one or more elements.

The power supply 22 supplies power to the one or more internal components of the network device 200 through the internal bus 27. The power supply 22 can be a self-contained power source such as a battery pack with an interface to be powered through an electrical charger connected to an outlet (for example, either directly or by way of another device). The power supply 22 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 20 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the network device 200, for example, for a user to enter any one or more profile configurations 250, a user identifier 260, a virtual user 270, a personality 280, an interaction type 290, any other information associated with a user or network device, or a combination thereof that are stored in memory 34. The network interface 20 can include, but is not limited to, various network cards, interfaces, and circuitry implemented in software and/or hardware to enable communications with and/or between the multi-modal portal system 18, the access point device 2, an extender access point device 3, and/or a client device 4 using any one or more of the communication protocols in accordance with any one or more connections (for example, as described with reference to FIG. 1). In one or more embodiments, the user interface 20 enables communications with a sensing device 5, directly or indirectly.

The memory 24 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical storage system, a hard disk or any other various layers of memory hierarchy. The memory 24 can be used to store any type of instructions, software, or algorithms including software 25, for example, a multi-modal portal application, for controlling the general function and operations of the network device 200 in accordance with one or more embodiments. In one or more embodiments, memory 24 can store any one or more profile configurations 250 associated with one or more user identifiers 260 so as to provide (for example, by a multi-modal portal application of a multi-modal portal system 18) aggregation, monitoring, and control of user data, such as user data received from one or more sensing devices 5 so as to provide one or more intelligent notifications to a user and/or one or more interactions with a user. The one or more user identifiers 260 can comprise a unique identifier associated with one or more users, one or more network devices, or both. The one or more user identifiers 260 can be associated with one or more profile configurations 250 which include information associated with one or more profiles of one or more users. The one or more profile configurations 250 can be utilized to control which type of user can send and/or configure one or more intelligent notifications. In one or more embodiments, the profile configuration 250 and/or the user identifier 260 is stored in any type of storage medium local to or remote from the network device 200.

The one or more profile configurations 250, the user identifier 260, or both can be associated with one or more virtual users 270. The one or more virtual users 270 can comprise a digital representation of any of an entity, an object, a person, such as an avatar, any other reality-based characterization, or any combination thereof. The one or more virtual users 270 can be associated with one or more personalities 280. The one or more personalities 280 can comprise any of a family member, a friend, a medical professional, a trusted user, a supporter, an advisor, a service provider, a mental health professional, a confidant, any other personality, or any combination thereof. The one or more personalities 280, the one or more virtual users 280 or both can be associated with one or more interaction types 290. The one or more interaction types 290 can comprise a medical examination, a reminder, a familial conversation (such as any of a celebration, a birthday, a vacation, a planned outing, a play, a concert, any one or more events associated with a family member, acquaintance, friend, and/or any other person), a schedule, an activity, an education program, information, a weather forecast, a newscast, any other conversation, or any combination thereof.

Figure 3:
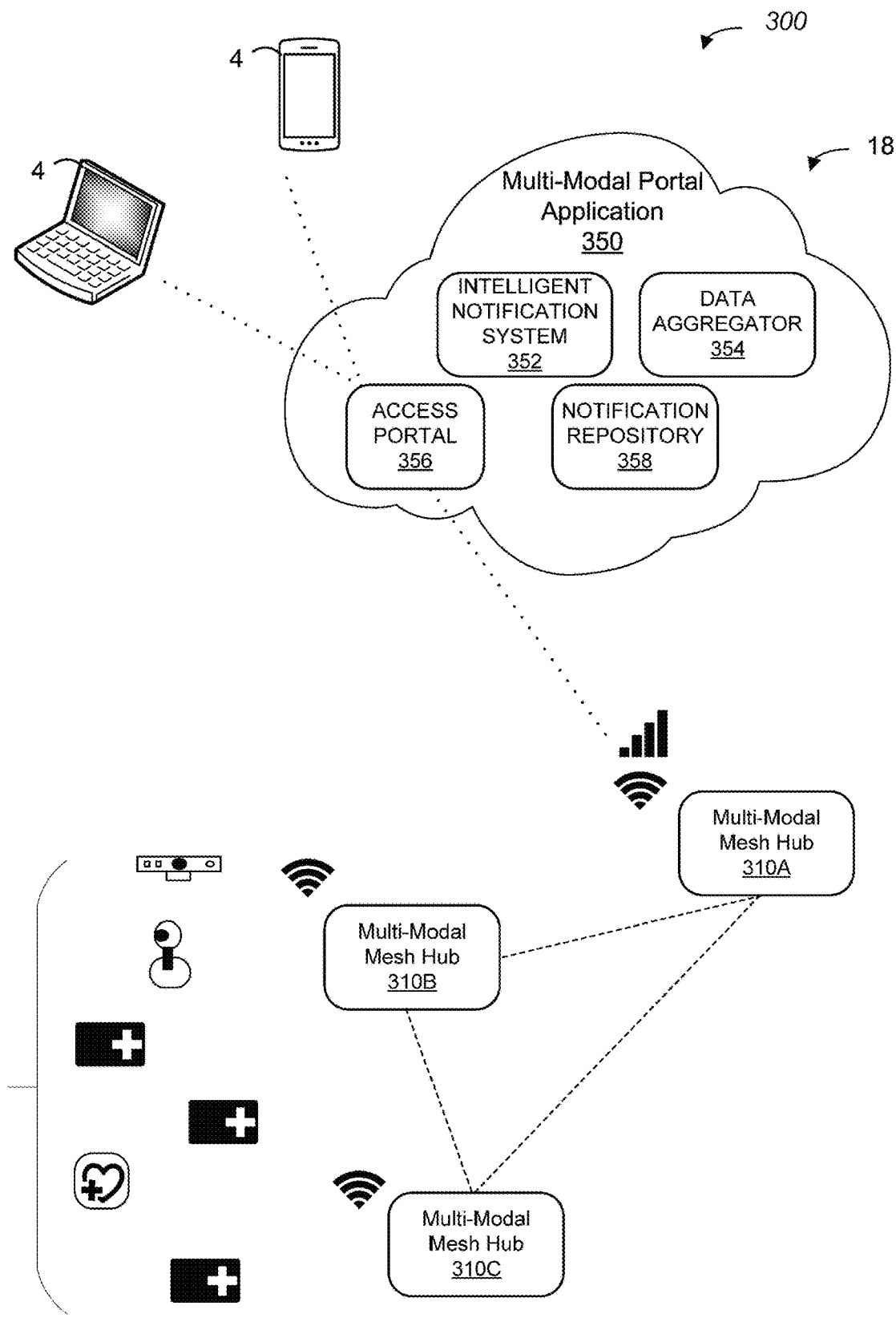
FIG. 3 is an illustration of a multi-modal portal system in a network environment, according to one or more aspects of the present disclosure.

The controller 26 controls the general operations of the network device 200 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 25 which can include a multi-modal portal application as discussed with reference to FIG. 3, including, but not limited to, an intelligent notification system. Communication between the components (for example, 20-26) of the network device 200 may be established using an internal bus 27.

The network interface 21 can include various network cards, interfaces, and circuitry implemented in software and/or hardware to enable communications with any one or more other network devices, for example, any of a client device 4, ISP 1, any other network device (for example, as described with reference to FIG. 1), or a combination thereof. The communications can utilize a visual interface connection that allows for a visual interface between two users, for example, a communication that utilizes an optical instrument (such as for a video call or for an image capture). For example, the network interface 21 can include multiple radios or sets of radios (for example, a 2.4 GHz radio, one or more 5 GHz radios, and/or a 6 GHz radio), which may also be referred to as wireless local area network (WLAN) interfaces. In one or more embodiments, one radio or set of radios (for example, 5 GHz and/or 6 GHz radio(s)) provides a backhaul connection between the wireless extender access point device 3 and the access point device 2, and optionally other wireless extender access point device(s) 3. In one or more embodiments, the multi-modal portal system 18 is connected to or is part of the access point device 2 such that a backhaul connection is established between the multi-modal portal system 18 and one or more wireless extender access point devices 3. Another radio or set of radios (for example, 2.4 GHz, 5 GHZ, and/or 6 GHz radio(s)) provides a fronthaul connection between the extender access point device 3 and one or more client device(s) 4.

The wide area network (WAN) interface 23 may include various network cards, and circuitry implemented in software and/or hardware to enable communications between the access point device 2 and the ISP 1 using the wired and/or wireless protocols in accordance with connection 13 (for example, as described with reference to FIG. 1).

The DSP 28 can comprise an AI system and/or machine learning (ML) system for processing any one or more audio inputs received from a user, for example, via any of a VCS 110, a sensing device 5, a client device 4, or any combination thereof. The DSP 28 can comprise a memory storing one or more instructions for detecting, processing, and analyzing one or more audio inputs. The one or more instructions of the DSP 28 can be configured for one or more locations of a network environment 100. For example, the DSP 28 can be configured to be placed in a kitchen, a bathroom, an office, etc. such that the DSP 28 comprises one or more instructions for detecting, processing, and analyzing an audio input associated with one or more locations.

FIG. 3 illustrates a multi-modal portal system 18 in a network environment 300, according to one or more aspects of the present disclosure. While FIG. 3 illustrates a network environment 300, the present disclosure contemplates that the multi-modal portal system 18 can be located within any type of network, including a local network of a trusted user or supported that has access to a client device 4 associated with a user, for example, via the Internet 6, an ISP 1, or both. The network environment 300 provides an end-to-end closed network for management, control, and access of user data by one or more authorized users (also referred to as trusted user or supporter. The network environment 300 includes a multi-modal portal system 18, one or more client devices 4, one or more multi-modal mesh hubs 310A, 310B, and 310C (collectively referred to as multi-modal mesh hub(s) 310), and one or more sensing devices 5. In one or more embodiments, any of the multi-modal mesh hubs 310 can comprise an IoT hub that provides an interface to one or more sensing devices 5, including an interface that provides for the display of one or more intelligent notifications. In one or more embodiments, any one or more of the multi-modal mesh hubs 310 can store user data from any of the one or more sensing devices 5, for example, when a connection to the multi-modal portal system 18 is not available.

The multi-modal portal system 18 can be a network device 200 as discussed with reference to FIG. 2. The multi-modal portal system 18 provides a well-defined secure storage, aging, purging and external data transmission with egress points for user data based on explicit authorization with complete audit trail. The multi-modal portal system 18 can comprise a multi-modal portal application 350.

The multi-modal portal application 350 can be a software 25 and can provide management, control, and access of user data associated with one or more users. The multi-modal portal application 350 provides a secure remote interface to information associated with a user based one or more profile configurations 250. For example, the multi-modal portal application 350 can comprise any of an access portal 356, a data aggregator 354, a notification repository 358, an intelligent notification system 352, or any combination thereof. The access portal 356 can provide an interface to one or more client devices 4 connected directly or indirectly to the multi-modal portal system 18 and one or more multi-modal mesh hubs 310 so as to allow the intelligent notification system 360 to send one or more intelligent notifications to a client device 4 associated with a user. The access portal 356 can comprise any of an application programming interface (API), a webpage, a graphical user interface, any other interface, or a combination thereof. For example, the interface can include a visual interface connection that can be established between any two network devices.

The data aggregator 354 can comprise any type of non-transitory computer-readable storage medium as discussed with reference to FIG. 2. The data aggregator 354 can store any of user data, for example, from one or more sensing devices 5, one or more profile configurations 250, the one or more user identifiers 260, or any combination thereof. The user data and/or the one or more profile configurations can be associated with a user, a network device 200, a network environment, such as a home network environment, any other individual and/or system, or any combination thereof. The user data, the one or more profile configurations 250, the one or more user identifiers 260, or any combination thereof can be stored in any type of storage system including, but not limited to, a flat file system, a database, a table, a data structure, a data object, any other type of storage system, or any combination thereof.

The notification repository 358 can comprise any type of non-transitory computer-readable storage medium as discussed with reference to FIG. 2. The notification repository 358 can store multi-media data or any other data associated with, for example, one or more intelligent notifications that are configurable as discussed with reference to FIG. 5D. In one or more embodiments, the notification repository 358 is part of or included within the data aggregator 354 or any other component of the multi-modal portal application 350. The one or more intelligent notifications can be stored in any type of storage system including, but not limited to, a flat file system, a database, a table, a data structure, a data object, any other type of storage system, or any combination thereof. In one or more embodiments, the notification repository 358 is remote from the multi-modal portal application 350.

The intelligent notification system 352 can process user data, for example, user data aggregated by the data aggregator 354 from one or more sensing devices 5 associated with a user. The intelligent notification system 352 can query the data aggregator 354 for the one or more profile configurations 250 associated with the one or more user identifiers 260. The intelligent notification system 352 can determine based on the one or more profile configurations 250 how to analyze the user data and to configure and/or generate an intelligent notification based on the user data. For example, the intelligent notification system 352 can compare a schedule associated with a user identifier 260 to user data received from the data aggregator 354 and determine whether a task associated with the schedule has been completed so as to generate an intelligent notification, for example, any of automatically, in real-time, periodically, etc. The intelligent notification system 352 can send the generated intelligent notification to a client device 4 associated with the user identifier 260. An intelligent notification can comprise one or more elements that are configurable such as any of text (for example, text color, background color, font type, font size, font emphasis, any other text-based configuration, or any combination thereof), display attribute (for example, location (such as any of top, middle, bottom, side, or any combination thereof), size, border, translucency, overlay, etc.), time-out (for example, length of time present on a display), acknowledgement (for example, whether affirmative action is required by a user), preservation (for example, length of time preserved in a history or log), any other attribute, or any combination thereof. In one or more embodiments, an intelligent notification is generated by modifying a generic or default notification based on any of user data, a profile configuration, a schedule, a task, an event, any other information, or any combination thereof.

The intelligent notification system 352 can comprise or be coupled to a VCS 110 so as to provide a virtual interaction with a user. For example, the intelligent notification system 352 can identify any of a virtual user 270, a personality 280, an interaction type 290, or any combination thereof associated with an intelligent notification. In one or more aspects, in lieu of or in addition to providing the user with an intelligent notification, the VCS 110 can interact with a user via a virtual user 270 that has a personality 280 associated with an interaction type 290 indicated by the intelligent notification. For example, the intelligent notification system 352 can determine that a user has not taken a scheduled medication. The intelligent notification system 352 can provide one or more instructions to the VCS 110 to initiate a virtual interaction with the user via a virtual user 270 (such as an avatar) associated with a personality type 280 (such as a nurse) for an interaction type 290 (a medication or medical event). The VCS 110 can utilize the AI or machine learning of the DSP 28 to provide an interaction between the virtual user 270 and the user so as to provide a real-time, reality-based interaction with the user. For example, the VCS 110 can provide an output via a virtual user 270 to the user (for example, through an input/out device such as a display device, an audio output device (such as a speaker), or both). As the personal type 280 is that of a nurse, the AI or machine learning of the DSP 28 can utilize common phrases or structures associated with a nurse. Based on the audio input received in response to an output from the VCS 110, the DSP 28 can provide additional one or more outputs to continuation the interaction with the user so as to effectuate the completion of taking the dosage of medication by the user.

The multi-modal mesh hubs 310 can comprise any one or more network devices that can form a mesh of data connectivity hubs, for example, as indicated by the dotted lines. In one or more embodiments, multi-modal mesh hub 310A comprises an access point device 2, multi-modal mesh hub 310B comprises an extender access point device 3, and multi-modal mesh hub 310C comprises a client device 4. The multi-modal mesh hub 310A can interface or communicate with the access portal 356 so as to securely send user data to a multi-modal portal system 18 and receive one or more intelligent notifications from an intelligent notification system 352 of the multi-modal portal system 18. The multi-modal mesh hubs 310 can work together as a virtual connectivity hub to communicate with the one or more client devices 4 and/or one or more sensing devices 5 of a network environment 300. The one or more sensing devices 5 can be securely paired with any one or more multi-modal mesh hubs 310 to establish a secure association.

In one or more embodiments, the multi-modal mesh hub 310A connects directly to the multi-modal portal system 18 via an external data connection, such as an Internet Wi-Fi connection. In one or more embodiments, the multi-modal mesh hub 310A, or any other multi-modal mesh hub 310, can connect to the multi-modal portal system 18 via LTE or cellular connection that does not rely on an Internet Wi-Fi connection. In one or more embodiments, the LTE or cellular connection is a backup connection for the Internet Wi-Fi connection.

The one or more profile configurations 250 can comprise one or more parameters. For example, FIGS. 5A-5D illustrate one or more profile configurations 250 for a multi-modal portal system 18, according to one or more aspects of the present disclosure. The one or more profile configurations 250 are associated with a network environment such as discussed with reference to FIGS. 1 and 3. As illustrated in FIG. 5A, the one or more parameters of a profile configuration 250 can comprise one or more user profiles 502, one or more profile descriptions 504, one or more access parameters 506, one or more device identifiers 508, one or more encrypted credentials 510, one or more pre-authorization accesses 512, any other parameters associated with a user and/or network device, or a combination thereof.

The one or more user profiles 502 are associated with one or more users and/or network devices and can include, but are not limited to, any of a primary contact, a caregiver, a healthcare professional, a coordinator, a personal service, any other type of user and/or network device, or any combination thereof. In one or more embodiments, any of the one or more user profiles 502 can be designated as a trusted user (also referred to as a supporter). The one or more user profiles 502 can be associated with one or more profile descriptions 504 including, but not limited to, any of a family member, friend, and/or guardian, a personal staff member or nurse, a doctor, a care administrator, a general staff member, a trusted user, any other description, or a combination thereof as illustrated in FIG. 5B. The one or more user profiles 502 can be associated with one or more access parameters 506.

The one or more access parameters 506 can include the types of data that a user or a network device associated with a corresponding user profile 502 is allowed to access, such as to view, modify, store, manage etc. In one or more embodiments, the access parameters 506 can include any alphanumeric characters, a binary value, or any other value. For example, as illustrated, a "Yes" indicates access to the data while a "No" indicates that the data is not accessible by the corresponding user profile 502. In one or more embodiments, a binary "1" or "0" could be used. The one or more access parameters 506 can include, but are not limited to, any of a video call, an image data (such as from a camera), a diagnostic data (such as heart rate, blood pressure, oxygen level, weight, activity level, temperature, etc.), a sensor data, an activity data, an intelligent notification, a pre-authorization data, any other type of data, or a combination thereof as illustrated in FIG. 5B. As an example, the pre-authorization data can indicate whether or not a pre-authorization is required to access the data by the associated user profile 502, can include a pre-authorization access 512, such as a code that indicates a pre-authorization value, that the associated user can receive responses from a client user 410 and/or 420, such as a response to a video notification 509 of FIG. 5D. For example, all types of user except a personal services (general staff) may be allowed to configure, create, delete, or otherwise modify an intelligent notification.

A user identifier 260 can also be associated with a device identifier 508 such that an encrypted credential 510, a per-authorization access 512, or both can be associated with a user profile 502, a device identifier 508, or both. An encrypted credential 510 can be utilized by the multi-modal portal system 18 to provide authorization for an intelligent notification by a user associated with a user identifier 260 with a user profile 502. The pre-authorization access 512 can be associated with a user profile 502 such that a user associated with the user profile 502 is pre-authorized to access user data, for example, pre-authorized to generate or otherwise cause an intelligent notification to be sent to a client device 4 associated with a user. According to one or more aspects of the present disclosure, the intelligent notification can indicate that an interaction between a virtual user and the user is permitted, for example, as indicated by a "YES" (permitted) or a "NO" (not permitted).

As illustrated in FIG. 5C, for each user profile 502 associated with a user identifier 260, one or more encrypted credentials 510 and/or one or more pre-authorization accesses 512 can be associated with the user profile 502, a device identifier 508, or both. In one or more embodiments, a device identifier 508 can be associated with a device name, a mobile application, a portal, any other type of device or resource, or any combination thereof. In one or more embodiments, the pre-authorization access 512 can be indicative of an authorization code or time period, such as a date and/or time, that pre-authorization is permitted.

As illustrated in FIG. 5D, a user identifier 260 can be associated with one or more scheduling parameters. The one or more scheduling parameters can include, but are not limited to, a task 503, a task instruction 505, a schedule 507, a video notification 509, an additional video notification 511, any other scheduling parameter, or a combination thereof. The task 503 can be indicative of an aspect or action associated with a user. For example, in the context of an aging-in-place environment, the task 503 can indicate a dosage regimen associated with the user as part of the user's medical regimen. Each task 503 can be associated with a task instruction 505. The task instruction 505 and the schedule 507 can include details associated with the task 503. For example, the task instruction 505 can correspond to a dosage and the schedule 507 can correspond to a frequency or occurrence for taking, consumption of, or performing a particular regimen, such as taking medication indicated by a task 503.

The video intelligent notification 509 can be associated with a task 503 and be a type of intelligent notification. For example, an intelligent notification can comprise any of audio, video, multi-media, text, any other visual or auditory messaging, or any combination thereof. The video intelligent notification 509 can include any of audio, video, a pre-recorded multi-media data, any other audio and/or video data, or any combination thereof, for example, featuring a trusted user such that the video intelligent notification 509 is configurable based on user data, such as from data aggregator 354. The video intelligent notification 509 can be a personalized reminder regarding the task 503. Such a personalized reminder or message can be more persuasive, personal, or engaging than a default message that does not include a visual interface for viewing a generic notification and can be based on user data so as to be provide timely, current, relevant, informative, and/or accurate information to the user. In one or more embodiments, the video intelligent notification 509 can be the same for one or more tasks 503. In one or more embodiments, the video intelligent notification 509 can also include text, such as a transcription of the audio portion (for example, closed captioning) of the video intelligent notification 509 so that while the multi-media data is played back the transcription is also displayed to the user.

In one or more embodiments, the additional video intelligent notification 511 is the same as or similar to the video intelligent notification 509 except that the additional video intelligent notification 511 can include additional information associated with a schedule 507, a video intelligent notification to a response received from a user to a video intelligent notification 509, or both. For example, the additional video intelligent notification 511 can any of notify the user of the next scheduled video intelligent notification 509, provide additional information associated with the schedule 507, provide any other personalized message, be based on user data or additional user data received in real-time from the user, or any combination thereof.

In one or more embodiments, any scheduling parameter can be associated with any one or more other scheduling parameters. For example, a task 503 can be associated with one or more task instructions 505, one or more schedules 507, one or more video intelligent notifications 509, and one or more additional video intelligent notifications 511, such as when a particular medication must be taken multiple times during a day, at different dosage levels throughout a day, any other basis, or any combination thereof. As another example, a first video intelligent notification 509 can include a Recording A and a Recording B while a second video intelligent notification 509 can include a Recording D and a Recoding B. Similarly, a first additional intelligent video notification 511 can comprise a Recording F while a second additional video intelligent notification 511 can comprise the same Recording F. In one or more embodiments, the video intelligent notification 509, the additional video intelligent notification 511 or both can include a personalized message from one or more trusted users or any other individual, entity or personnel. As an example, the intelligent notification system 352 an utilize user data received from one or more sensing devices 5 (for example, received in response to a query to a data aggregator 354) to generate an intelligent notification by selecting one or more recordings (such as any of one or more video intelligent notifications 509 one or more additional video notifications 511, any one or more other notifications, or any combination thereof) based on any of the user data, a task 503, a task instruction 505, a schedule 507, or any combination thereof. In this way, an intelligent notification can be generated from a generic notification or newly created so as to provide the user with an improved experience as the intelligent notification is based on accurate, current, real-time, and/or relevant information.

While FIGS. 5A-5D illustrate one or more profile configurations 250 associated with a healthcare services network, the present disclosure contemplates that the one or more profile configurations 250 can be associated with any type of network. Additionally, the present disclosure contemplates that any one or more user profiles 502, one or more profile descriptions 504, one or more access parameters 506, one or more scheduling parameters, or any combination thereof can be added or deleted based on a particular network environment, including dynamically.

FIG. 4 is an illustration of an example intelligent notification to a user, according to one or more aspects of the present disclosure. A network device 200 can be connected to a client device 4 within a network environment 400 that comprises one or more network devices 200 as illustrated in FIG. 1, FIG. 3 or both. In one or more embodiments, the network device 200 is part of or within a client device 4 and/or any other device that comprises an I/O system for providing an intelligent notification to a user and/or an interaction between a virtual user and the user. For example, an I/O system can comprise a monitor or display device 450 of a client device 4. In one or more embodiments, the network device 200 can be connected to an ISP 1 so as to send user data to and receive one or more intelligent notifications from a multi-modal port system 18. For example, the network device 200 can be connected to a sensing device 5 for receiving user data associated with a user of the network environment 400. The network device 200 can comprise a VCS 110 or be connected indirectly and/or directly to a VCS 110, for example, via a multi-modal portal system 18.

The network device 200 can receive an intelligent notification from the multi-modal portal system 18. The intelligent notification can be a notification that is capable of being provided to a user via the client device 4, such as any of an audio/visual notification 402 that comprises, for example, a video, an audio notification 409 as an intelligent notification that comprises, for example, an audio message, a text notification 410 as an intelligent notification that comprises, for example, displayable text, or any combination thereof. As an example, the text notification 410 can comprise information such as any of a scheduled time 411 for a dosage, a type of medication 413, a dosage 415, a last taken 417, any other information associated with a schedule or a task associated with the intelligent notification, or any combination thereof. While FIG. 4 illustrates a particular type of intelligent notification, the present disclosure contemplates any type of intelligent notification that comprises information in any type of media or form, including, for example, an interaction between a virtual user and the user.

Figure 6:
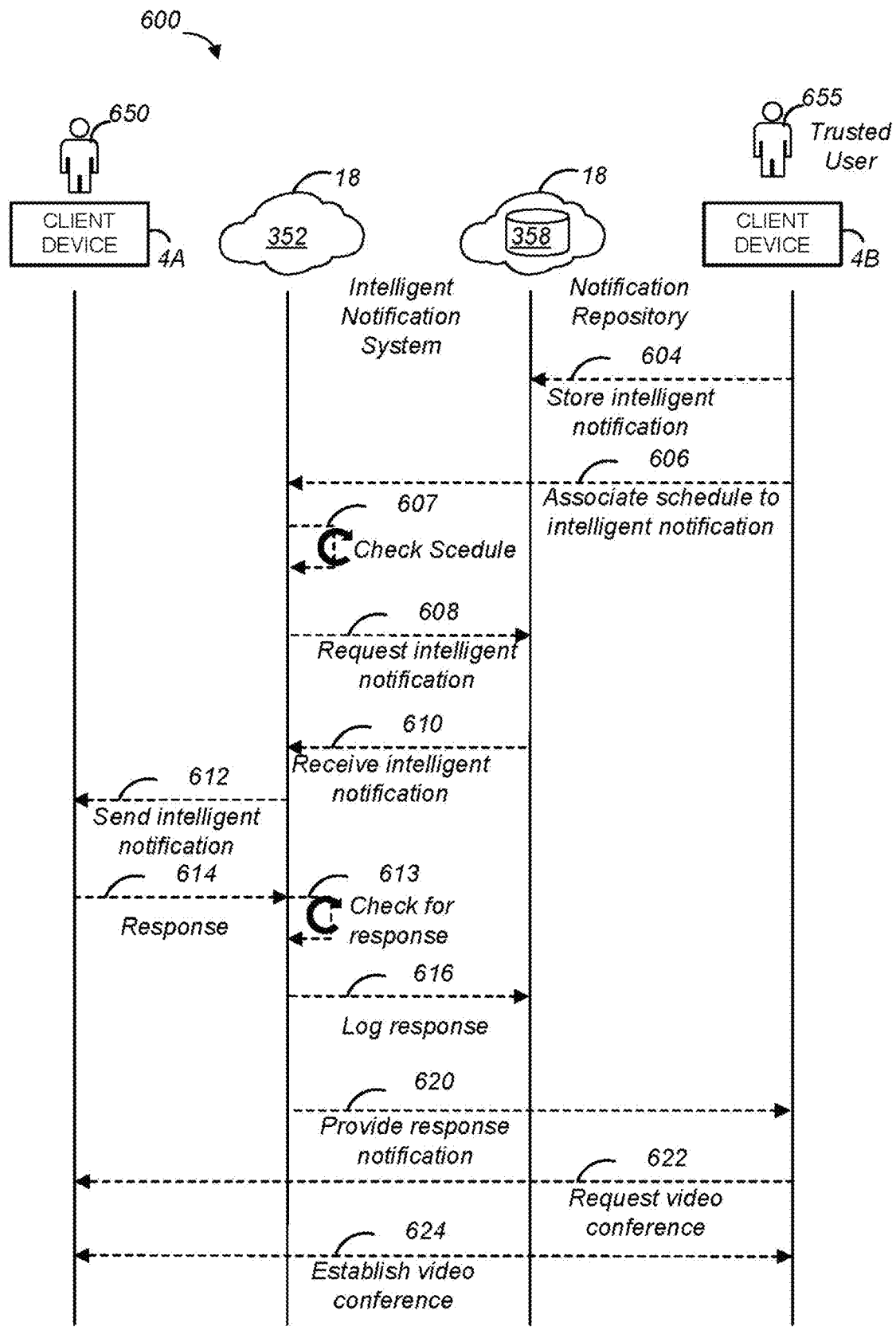
FIG. 6 illustrates a process for providing an intelligent notification to a network device in a network environment, such as a client device associated with a user, according to one or more aspects of the present disclosure.

While FIG. 4 illustrates a client device 4 with a display device 450, the present disclosure contemplates a client device 4 can be any type of network device 200 capable of providing an intelligent notification to a user, for example, a user 650 of FIG. 6, including an interaction between a virtual user and the user.

FIG. 6 illustrates a process for providing an intelligent notification to a network device 200 in a network environment 600, such as a client device 4A, associated with a user 650, according to one or more aspects of the present disclosure. A trusted user or supporter 655 can have an associated user profile 502, such as a family member, a physician, a nurse, other caregiver, authorized user and/or any other type of user. The trusted user 655 can create one or more intelligent notifications, for example, a video intelligent notification 509, that are configurable, selectable, combinable, or otherwise capable of being adapted and/or modified based on user data received from a network device 200, such as one or more sensing devices 5, one or more client devices 4, or both associated with a user 650. A network device 200, such as a client device 4B, can be associated with the trusted user 655.

The trusted user 655 can create or otherwise generate one or more intelligent notifications and send via the client device 4B at 604 the one or more intelligent notifications for storage in a notification repository 358 of a multi-modal portal system 18. The trusted user 655 can send at 606 via the client device 4B an instruction to the intelligent notification system 352 to associate a schedule to the one or more intelligent notifications. For example, the associate schedule to video notification can associate one or more video notifications 509, one or more additional video notifications 511, or both with one or more tasks 503, one or more corresponding task instructions 505, one or more schedules 507, or any combination thereof.

Once the scheduling parameters are set up or created as discussed with reference to FIG. 5D, the notification module 650 can determine at 607 to send one or more intelligent notifications to a user 650 based on user data and one or more schedules associated with the user 650. For example, the intelligent notification system 352 can query the one or more schedules 507 based on a trigger, a timer, a semaphore, a periodic query, a timer interval, any other basis, or a combination thereof to determine a match to a criteria, such as a current data, a current time, a current day of week, any other criteria, or a combination thereof. For example, a schedule 507 can indicate a schedule of 9:00 AM each day of the week that is associated with a task 503, such as a Prescription #1, and a task instruction 505, a Dosage #1 as illustrated in and discussed with reference to FIG. 6. In one or more embodiments, one or more triggers can be set for each one or more schedules 507. The intelligent notification system 352 can query a data aggregator 354 for user data associated with the user 650. For example, the intelligent notification system 352 can compare user data to a schedule 507 to determine that an intelligent notification should be sent to the user 650. As an example, the intelligent notification system 352 can determine based on the user data that any of the user 650 has not completed a task 503 associated with a schedule 507, that even if a task 503 has been completed, the user data indicates that an additional task 503 is required (for example, the user data indicates a blood pressure of the user 650 exceeds a threshold which requires the user 650 to take additional medication), a task 503 requires a reminder or an additional reminder, a user 650 is in at or about a display device, such as a network device, select a type of an intelligent notification that is different from a previous type of intelligent notification so as to not send the same type of intelligent notification within a predetermined timeframe, any other determination associated with an intelligent notification, or any combination thereof.

The intelligent notification system 352 can at 608 request an intelligent notification associated with the schedule 507 from the notification repository 358. At 610, the intelligent notification system 352 can receive the intelligent notification from the notification repository 358. The intelligent notification system 352 can modify the intelligent notification based on the user data and/or send the intelligent notification at 610 to the client device 4A. For example, the intelligent notification can be associated with a missed task 503, such as the user 650 did not take a dosage of a medication at the scheduled time such that the intelligent notification is selected based on the user data that indicates the user 650 failed to complete a task 503. As another example, the intelligent notification associated with a schedule 507 can be selected and received and the intelligent notification system 352 can modify the intelligent notification based on the user data, such as to indicate the specific task 503 that was not performed. For example, the intelligent notification received by the intelligent notification system 352 can indicate generally that the user 650 generally failed to complete a task 503 and the intelligent notification system 352 can modify the intelligent notification to indicate specific aspects of the task 503 that were not completed by the user 650, such as that the user 650 any of did not take a specific medication at a specific time, failed to acknowledge an instruction from the trusted user 655, did not act or respond per one or more aspects of a schedule 507, or any combination thereof.

According to one or more aspects of the present disclosure, the multi-modal portal system 18 comprises a VCS 110. The VCS 110 receives the request for intelligent notification at 608. The VCS 110 can determine an interaction type 290 based on any information, such as any of user data associated with the user 650, a schedule associated with the user 650, any other information, or any combination thereof. The VCS 110 can select a virtual user 270, a personality 280, or both based on the information and initiate an interaction between the virtual user 270 with a personality 280 and the user 650, for example, by outputting one or more outputs via the virtual user 270.

The intelligent notification system 352 can continuously, periodically, or at timed intervals perform a check at 613 for a response from the user 650 to the intelligent notification at 612. The intelligent notification system 352 can receive at 614 a response from the user 650 to the intelligent notification at 612. The response 614 can comprise any of a video response, a verbal-only response, a non-responsive response, any other response, such as user sensor data, associated with a sensing device 5, or any combination thereof. In one or more embodiments, the response 614 can indicate an acknowledgement of the intelligent notification, such as an affirmation, a decline of any message or notification, or any other response from the user 650. For example, the user 650 in response to a video notification 509 to take a Medication #1 can send a video response, a verbal response, a text-based response, or any other type of response to the intelligent notification that indicates a status, such as the Medication #1 has been taken as instructed, has not been taken, any other status, or a combination thereof. In one or more embodiments, the response is user sensor data associated with one or more sensing device 5, a client device 4, and/or any other network device that relates to the intelligent notification 612. For example, user data can indicate that the user is experiencing an increase in blood pressure. The intelligent notification 612 can indicate to the user that it is time for the user to take a prescription, for example, per a task associated with the profile configuration 250 associated with the user related to blood pressure. The intelligent notification system 352 can receive a response, for example, user data that indicates a decrease in blood pressure and based on the response send one or more additional intelligent notifications. In this way the intelligent notification system 352 can provide one or more intelligent notifications to a user that are relevant and informative.

The response at 614 can be received by the intelligent notification system 352 which can log the response to the multi-modal portal system 18, such as to the notification repository 358 at 616. For example, logging the response can include creating or maintaining a log of all activity associated with the user 650. The activity logged can include a timestamp and corresponding identifier for all notifications sent to and responses received from the user 650. In this way, a trusted user 655 or any other user with appropriate authorization can review all activities associated with the user 650, for example, to confirm conformance to a schedule.

According to one or more aspects of the present disclosure, a DSP 28 of the VCS 110 can receive the response at 614 and using AI and/or machine learning determine one or more additional outputs to output to the user 650 via the virtual user 270. For example, if the personality 280 is that of a nurse, the virtual user 270 can utilize the AI and/or machine learning to determine an output based on the response at 614.

The notification module 650 can in response to the response at 614 from the user 650 or automatically provide an additional intelligent notification at 618. For example, if the response at 614 indicates that the user 650 has not taken the Medication #1, the intelligent notification system 352 can determine that an additional intelligent notification should be generated based on the response and/or additional user data, query the notification repository 358 for an additional intelligent notification, or both. In this way, notifications sent to the user 650 from the multi-modal portal system 18 can be configured or customized based on user data such that one or more generic notifications can be replaced with one or more intelligent notifications that provide the user 650 with more accurate, real-time, reliable, relevant, and/or timely information so as to avoid notification fatigue, complacency, and/or monotony of generic notifications.

In one or more embodiments, the intelligent notification system 352 can send an alert to the trusted user 655 based on the response received at 614. The alert can include or indicate a response from the user 650 to the intelligent notification, the additional intelligent notification, or both. In response to the alert, the trusted user 655 via the client device 4B can send a video conference request at 622 to the user 650 via client device 4A. At 624, a video conference can be established between the client device 4A and the client device 4B so that the user 650 and the trusted user 655 can communicate. While a video conference is discussed with respect to FIG. 6, the present disclosure contemplates any type of request to establish any communication at 622, such as a telephone, a chat, a text-based messaging, etc.

Figure 7:
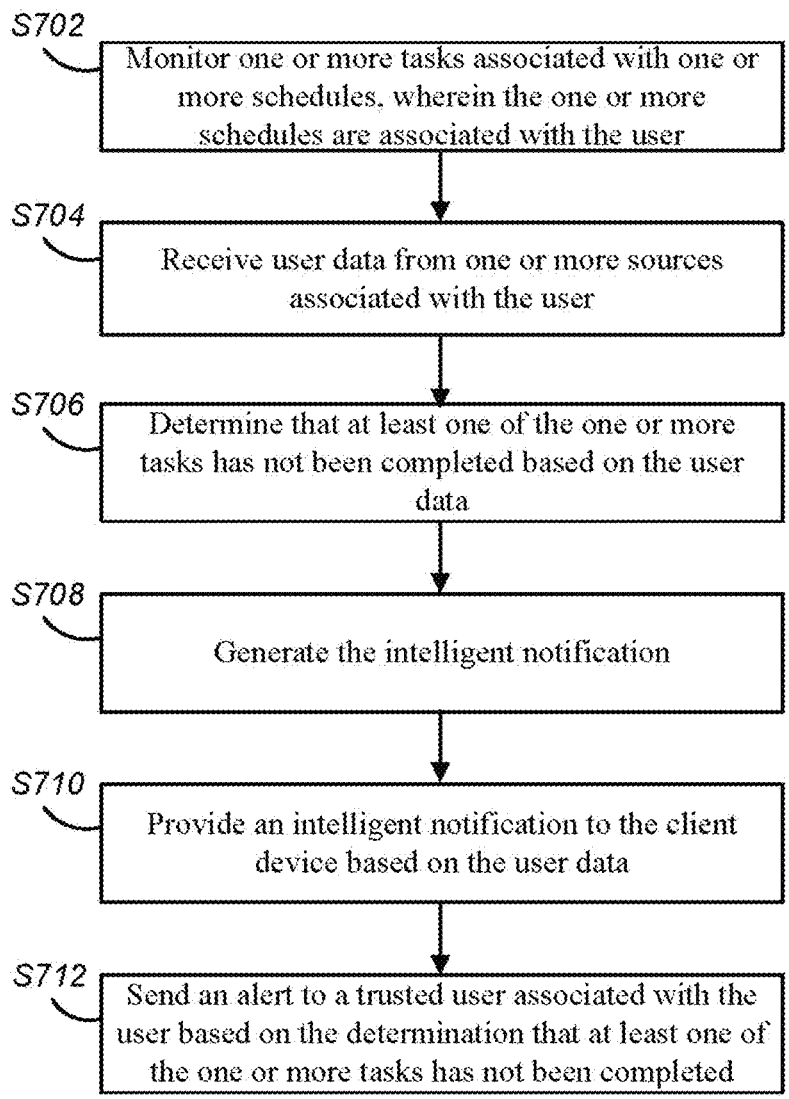
FIG. 7 is a flow chart illustrating a method for providing an intelligent notification to a client device associated with a user, according to one or more aspects of the present disclosure.

FIG. 7 is a flow chart illustrating a method is a flow chart illustrating a method for providing an intelligent notification to a client device associated with a user, according to one or more aspects of the present disclosure. For example, an intelligent notification system 352 of a multi-modal portal system 18 may be programmed with one or more instructions that when executed by a processor causes the intelligent notification system 352 to send one or more intelligent notifications to a network device, such as a client device 4, associated with a user. In FIG. 7, it is assumed that any one or more of the network devices include their respective controllers and their respective software stored in the respective memories, as discussed herein in connection with any one or more figures, which when executed by their respective controllers perform the functions and operations in accordance with the example embodiments of the present disclosure (for example, including providing an intelligent notification to a user).

The intelligent notification system 352 comprises a controller 26 that executes one or more computer-readable instructions, stored on a memory 24, that when executed perform one or more of the operations of steps S702-S712. The intelligent notification system 352 can comprise one or more software 25. While the steps S702-S712 are presented in a certain order, the present disclosure contemplates that any one or more steps can be performed simultaneously, substantially simultaneously, repeatedly, in any order or not at all (omitted).

At step S702, the intelligent notification system 352 monitors one or more tasks associated with one or more schedules that are associated with a user, for example, an aging-in-place elderly person. The tasks can be monitored any of periodically, automatically, manually (for example, initiated by a user or other application) at timed intervals, randomly, in real-time, any other time interval, or any combination thereof. The monitoring can comprise any of analysis of a profile configuration, accessing a repository that comprises the profile configuration associated with the one or more tasks (for example, querying a network resource and/or a local repository), determining a time (such as access a clock of a processor), any other monitoring or any combination thereof.

At step S704, the intelligent notification system 352 receives user data from one or more sources associated with the user. For example, the one or more sources can comprise any of one or more sensing devices 5, one or more client device 4, any other network device 200 associated with the user, or any combination thereof. Based on the user data, the intelligent notification system 352 can at step S706 determine that at least one of the one or more tasks has not been completed. For example, the user may have a task associated with a schedule of the user as part of a profile configuration associated with the user that requires the user to take a dosage of medicine at a certain time every day. If the user data indicates that movement or sounds associated with such a task has not occurred, the intelligent notification system 352 will determine that the task has not been completed.

At step S708, the intelligent notification system 352 generates an intelligent notification. The generation of the intelligent notification can be based on the user data, any of at least one of the one or more tasks has not been completed based on the user data, one or more profile configurations associated with the user, modification of a stored notification based on the user data, or any combination thereof. The intelligent notification system 352 can provide at step S710 the intelligent notification to the client device. For example, the generated intelligent notification based on the user data and/or any other basis can be provided to the client device. In one or more embodiments, the intelligent notification system 352 can send an additional intelligent notification based on additional user data or other information received before, after or during the generation of the intelligent notification.

At step S712, the intelligent notification system 352 can send an alert to a trusted user associated with the user, for example, associated with a profile configuration associated with the user, based on the determination that at least one of the one or more tasks has not been completed. The intelligent notification system 352 can send the alert any of automatically, upon request by the trusted user, at periodic intervals, any other time interval, or any combination thereof.

Figure 8:
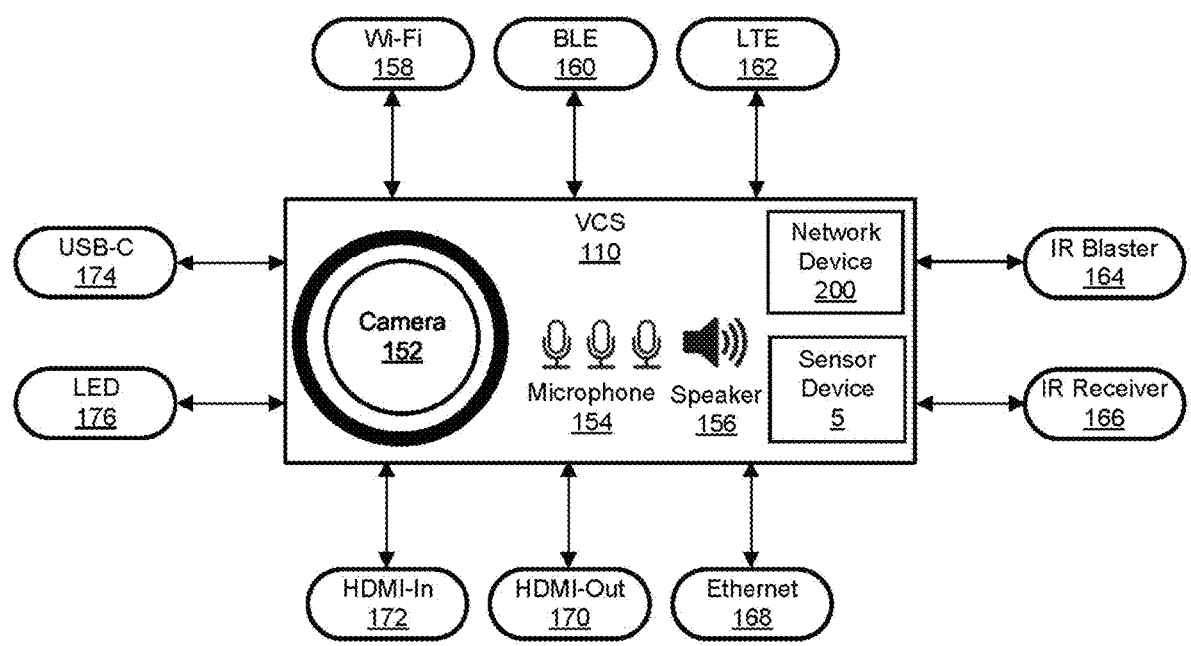
FIG. 8 illustrates a virtual companion system for providing a virtual interaction between a user and a virtual user, according to one or more aspects of the present disclosure.

FIG. 8 illustrates a VCS 110, according to one or more aspects of the present disclosure. The VCS 110 can comprise an optical instrument or an image capture device (such as a camera 152 or any other device that can obtain one or more visuals of a client user), an audio input device (such as a microphone 154, a microphone array, a far field voice (FFV) solution, any other device for capturing sound, etc.), an audio output device (such as a speaker 156), a sensor or sensing device 5, and a network device 200. In one or more embodiments, the VCS 110 is a network device 200 that comprises a DSP 28. In one or more embodiments, any one or more components of the VCS 110 can be included within or external to (such as directly or indirectly connected to) the VCS 110. The VCS 110 can include any of one or more ports or receivers, for example, a Wi-Fi (such as a Wi-Fi5 (dual-band simultaneous (DBS))) port 158, a BLE port 160, an LTE port 162, an infrared (IR) blaster port 164, and IR receiver port (166), an Ethernet port 168, an HDMI-Out port 170, an HDMI-In port 172, an external power supply (such as a universal serial bus type-C (USB-C), an LED output 176, or any combination thereof. The sensing device 5 can include any one or more types of sensors, for example, as discussed with reference to FIG. 1, such as any of a power sensor, a temperature sensor, a light or luminosity sensor, a humidity sensor, a motion sensor, a biometric sensor (such as a blood pressure monitor, oxygen saturation meter, pulse meter, etc.), a motion sensor, any other type of sensor, or any combination thereof.

A network device, such as network device 200 discussed with reference to FIG. 2, can include software, for example, as discussed herein, to send and/or receive any of a video notification, an image (for example, an image of a client user) via camera 152, any data associated with one or more sensor devices 5, microphone 154, speaker 156, any other element, or combination thereof. Any notification can include data for display on a display device associated with the VCS 110 and/or a network device, for example, any of a television, a monitor, a client device 4 with display functionality connected to and/or part of the VCS 110, a user interface (such as user interface 20 discussed with reference to FIG. 2), or any combination thereof.

The VCS 110 can be connected to one or more network devices, such as any of one or more client devices 4, one or more extender access point devices 3, an access point device 2, one or more sensing devices 5, any other network device, or any combination thereof. In one or more embodiments, the VCS110 pairs with a network device, such as a client device 4, so as to receive user data from the network device.

The VCS 110 can comprise any one or more elements of a network device 200. In one or more embodiments, the VCS 110 does not require Wi-Fi connectivity but rather can communicate with an access point device 2 using any one or more short range wireless protocols. A VCS 110 can include any of a BLE radio, a ZigBee radio, a LoRa radio, any other short range connectivity technology, or any combination thereof for communication to any one or more other network devices, including, but not limited to, one or more sensing devices 5.

The VCS 110 can be used to provide an interaction between a virtual user 270 and the user associated with the VCS 110. For example, mental and physical health are essential for providing one or more services to a user, especially an elderly user that is aging-in-place. To enhance engagement with a user, a VCS 110 can provide a virtual user 270 that interacts with the user so as to provide real-time, relevant, and informative interactions that are not simply generic, monotonous, and/or stale reminders. The interaction with the user can relate to any one or more interaction types 290. The one or more interaction types 290 can be configured for a particular user, for example, associated with a profile configuration 250 associated with a user identifier 260 of the user. In this way, the interaction between the virtual user 270 and the user are customizable so as to more fully engage the user.

A virtual user 270 can take any form that is digitally representable, such as an avatar. The virtual user 270 can be associated with a user profile 502 such that each user profile 502 has one or more associated virtual users 270. For example, a virtual user 270 can be associated with a primary contact, a caregiver, etc. as discussed with reference to FIG. 5B. each user profile 502 can have an access parameter 506 that indicates that the user profile has access or is permitted to utilize an associated virtual user 270, for example, via the intelligent notification access parameter, another access parameter 506, or both.

An interaction type 290 can be used to instruct the virtual user 270 to interact with the user using a personality 280 that is relatable to the interaction type 290. For example, a user may have difficulty remembering and performing health-related tasks. The virtual user 270 can use a personality 280 of a nurse to provide an interaction of an interaction type 290 of medicine or medical examination so as to interact with the user based on a schedule, user data, or both such that the interaction is based on actual events and not simply pre-recorded information, such as a static schedule. The interaction can include information associated with taking medication, performing a test, reminding about an appoint, initiating a session with a medical professional (such as a video-conference), etc. For example, based on the user data, the VCS 110 can cause virtual user 270 to initiate an interaction with the user that uses natural language so as to determine whether the user has completed a task, such as taken a dosage, and based on the interaction initiate one or more other interactions, for example, to reminder the user of the schedule or task to be completed. The VCS 110 can receive additional user data that indicates that the user has or has not completed, for example, a task and based on the additional user data provide an additional interaction, such as an interaction that provides any of additional information, provides a different personality (such as a different personality that instructs the user in a different tone so as to convey immediacy of a task). As another example, the virtual user 270 can also based on user data that indicates the user is awake, a time of morning, and/or in the kitchen so as to initiate an interaction for one or more morning tasks, such as any of one or more reminders for any morning medication, one or more appointments, any other reminders, or any combination thereof, request for feedback on one or more conditions associated with the user, one or more greetings or updates, such as for any of events, celebrations, birthdays, news, sports, any other event, or any combination thereof, any other information, or any combination thereof. Similarly, an interaction for one or more other tasks can be initiated based on the user data. Based on the interaction with the user, the VCS 110 can send to a trusted user, for example, an update on the user or that the user did not cooperate or complete a task within a predetermined time period. For example, an interaction that extends beyond a threshold duration can trigger the VCS 110 to send a notification to the trusted user.

The virtual user 270 can comprise any of a digitally generated image, a stored image, or any other Image. The virtual user 270 can include attributes that resemble real-life persons so as to provide the user with a comforting audio/visual interaction. The virtual user 270 interacts with the user using a words and/or phrases configured for the particular user so as to provide an conversational manner for the interaction. The user need not understand, initiate or otherwise provide instructions for the virtual user 270 to initiate interaction with the user. The virtual user 270 can be presented to the user via a display device 450, for example. The virtual user 270 can be presented in a designated area, full-screen, or any other dimension of the display device.

According to one or more aspects, the virtual user 270 can be integrated with one or more services, such as any of a social media application, a video-conference application, a reminder or scheduling application, a healthcare provider service, an information service, any other application and/or service, or any combination thereof so as to allow the user to engage with these one or more services. In this way, the user can interact with the virtual user 270 to any of send a message to a contact, receive a message from a contact, schedule an appointment, order one or more products or services, initiate a telephone call, initiate a video-conferencing session, initiate any other service, or any combination thereof.

Figure 9:
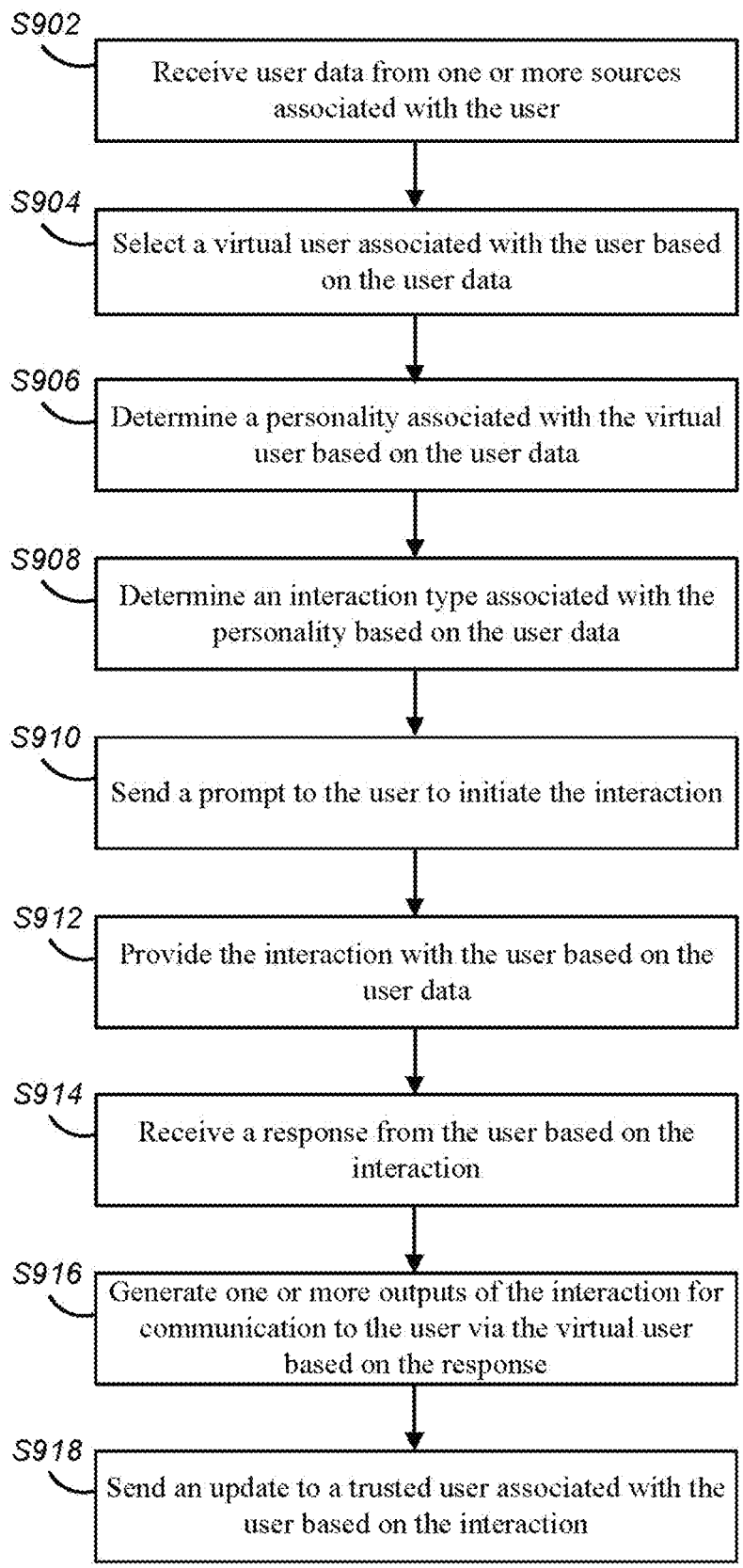
FIG. 9 is a flow chart illustrating a method for providing a virtual interaction associated with a user, according to one or more aspects of the present disclosure.

FIG. 9 is a flow chart illustrating a method for providing a virtual interaction associated with a user, according to one or more aspects of the present disclosure. For example, A VCS 110 may be programmed with one or more instructions that when executed by a processor causes the VCS 110 to provide an interaction associated with a user. In FIG. 9, it is assumed that any one or more of the network devices (such as any of the VCS 110, one or more sensing devices 5, one or more client device 4, any other device, or any combination thereof) include their respective controllers and their respective software stored in the respective memories, as discussed herein in connection with any one or more figures, which when executed by their respective controllers perform the functions and operations in accordance with the example embodiments of the present disclosure (for example, including providing an interaction associated with user, such as an interaction between the user and a virtual user).

The VCS 110 comprises a controller 26 that executes one or more computer-readable instructions, stored on a memory 24, that when executed perform one or more of the operations of steps S902-S918. The VCS 110 can comprise one or more software 25. While the steps S902-S918 are presented in a certain order, the present disclosure contemplates that any one or more steps can be performed simultaneously, substantially simultaneously, repeatedly, in any order or not at all (omitted).

At step S902, the VCS 110 receives user data from one or more sources associated with the user. The user data can comprise any of user sensor data from one or more sensing devices 5, information associated with a profile configuration 250 associated with the user, for example, a tasks and/or a schedule, information from a network resource (for example, a multi-modal portal system 18), data from one or more other network devices, or any combination thereof. For example, the VCS 110 can send receive from a memory information associated with a profile configuration 250 that indicates a task (such as a prescription associated with dosage) associated with a task instruction and a schedule. Based on the information, the CS 110 can proceed with the process.

At step S904, the VCS 110 can select a virtual user associated with the user based on the user data. For example, one or more virtual users 270 can be associated with a user and/or a profile configuration 250 associated with the user. The VCS 110 can select a particular virtual user 270 that relates to the user data so as to provide an engaging interaction with the user. For example, any one or more virtual users 270 can be associated with any one or more personalities 280. At step S906, the VCS 110 can determine a personality of the one or more personalities 280 based on the user data. For example, if the user data indicates that the user is experiencing an increase in blood pressure and that a schedule is associated with a task that indicates a prescription is required, the VCS 110 can determine that the virtual user 270 selected should be a medical professional and that the personality 280 should be that of a nurse or caregiver. At step S908, the VCS 110 can also determine an interaction type 290 associated with the personality 280 based on the user data. For example, the interaction type 290 can indicate that a schedule and/or a reminder such that the virtual user 270 of a nurse provides an interaction related to the schedule and/or the reminder.

At step S910, the VCS 110 can send a prompt to the user to initiate the interaction. For example, the VCS 110 can any of display a message on a display device associated with the user, cause output of a sound so as to draw the attention of the user, provide any other indicator, or any combination thereof. The prompt can be based on the user data such that the prompt is triggered by the user data, for example, user data indicating any of a schedule, a task, a reminder, any other indication of an interaction, or any combination thereof. In this way, the privacy of the user is protected as the user can permit or deny the interaction. According to one or more aspects of the present disclosure, the user is not allowed to ignore the prompt, for example, the prompt is an indicator that an interaction is about to start.

At step S912, the VCS 110 can provide the interaction between the virtual user and the user based on the user data. The VCS 110 can provide the interaction as an interactive natural language communication between the virtual user and the user using, for example, based on an AI system or machine learning system. The virtual user can provide the interaction by, for example, at step S914, receiving a response from the user based on the interaction. For example, the virtual user can initiate the interaction by providing the user a reminder or a communication regarding a schedule, such as "Mom, it looks like your blood pressure is a little high, did you remember to take your medicine?" The VCS 110 can receive a response from the user of "Yes", "No", or any other response. Based on the response, the VCS 110 can interact with the user with an encouraging communication to engage the user and to prompt the user to complete a task, for example, to take the prescription. The VCS 110 provides a non-generic and meaningful interaction with the user so as to engage the user. At step S916, for example, the VCS 110 can generate one or more outputs of the interaction for communication to the user via the virtual user based on the response from user at step S914. For example, the one or more inputs can be additional information to encourage the user to complete the task, such as historical information (for example, "Mom, yesterday you took your prescription at this time and your blood pressure returned to normal").

At step S918, the VCS 110 can send an update to a trusted user associated with the user, for example, associated with a profile configuration 250 associated with the user, based on the interaction. For example, the VCS 110 can determine that the user has not taken the prescription based on the task and/or schedule associated with the user and the update can be sent to inform the trusted user that the task and/or schedule has not been completed. The update can comprise any of the user data, a summary or transcript of the interaction, a recording of the interaction, any other information, or any combination thereof. In this way, the VCS 110 can provide the user with an interaction (such as a compassionate care interaction based on AI generated natural language) and still provide a trusted user with information necessary to ensure that the user receives proper care and/or services.

While the present disclosure discusses an aging-in-place environment, the present disclosure contemplates any other environment that requires user data to be sent to a remote network device and that one or more intelligent notifications be provided within a secure and private network environment.

A user is more likely to participate in a schedule or complete tasks when the user is actively engaged or is provided with accurate information reflective of current user data. The novel solutions discussed herein provide an improved notification to a user by generating intelligent notifications based on user data that more accurately provides for a notification that is relevant, informative, not monotonous, and configurable so as to engage the user and increase efficacy of the intelligent notification system.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A virtual companion system (VCS) for providing an interaction between a virtual user and a user comprising:
   a memory storing one or more computer-readable instructions; and
   a processor configured to execute the one or more computer-readable instructions to:
   receive user data from one or more sources associated with the user, said user data comprising information associated with a profile configuration of the user, said profile configuration indicates a task that the user has to complete;
   select a virtual user associated with the profile configuration of the user based on the user data, wherein the virtual user is any of a digital representation of an entity, an object, a person, a reality-based characterization, or any combination thereof; and
   provide the interaction between the virtual user and the user based on the user data, the virtual user sending to the user a communication regarding the task that the user has to complete.

2. The VCS of claim 1, wherein the processor is further configured to execute one or more instructions to:
   determine a personality associated with the virtual user based on the user data.

3. The VCS of claim 2, wherein the processor is further configured to execute one or more instructions to:
   determine an interaction type associated with the personality based on the user data.

4. The VCS of claim 1, wherein the processor is further configured to execute one or more instructions to at least one of:
   send an update to a trusted user associated with the user based on the interaction; and
   send a prompt to the user to initiate the interaction.

5. The VCS of claim 1, wherein the processor is further configured to execute one or more instructions to:
   receive a response from the user based on the interaction; and
   generate one or more outputs of the interaction for communication to the user via the virtual user based on the response.

6. The VCS of claim 1, wherein the virtual user is an avatar associated with a user profile, wherein the user profile is associated with the user.

7. The VCS of claim 1, wherein the interaction comprises a natural language communication based on artificial intelligence system.

8. A method for providing by a virtual companion system (VCS) an interaction between a virtual user and a user, the method comprising:
   receiving user data from one or more sources associated with the user, said user data comprising information associated with a profile configuration of the user, said profile configuration indicates a task that the user has to complete;
   selecting a virtual user associated with the profile configuration of the user based on the user data, wherein the virtual user is any of a digital representation of an entity, an object, a person, a reality-based characterization, or any combination thereof; and
   providing the interaction between the virtual user and the user based on the user data, the virtual user sending to the user a communication regarding the task that the user has to complete.

9. The method of claim 8, further comprising:
   determining a personality associated with the virtual user based on the user data.

10. The method of claim 9, further comprising:
    determining an interaction type associated with the personality based on the user data.

11. The method of claim 8, further comprising at least one of:
    sending an update to a trusted user associated with the user based on the interaction; and
    sending a prompt to the user to initiate the interaction.

12. The method of claim 8, further comprising:
    receiving a response from the user based on the interaction; and
    generating one or more outputs of the interaction for communication to the user via the virtual user based on the response.

13. The method of claim 8, wherein the virtual user is an avatar associated with a user profile, wherein the user profile is associated with the user.

14. The method of claim 8, wherein the interaction comprises a natural language communication based on artificial intelligence system.

15. A non-transitory computer-readable medium of a virtual companion system (VCS) storing one or more instructions for providing an interaction between a virtual user and a user, which when executed by a processor of the VCS, cause the VCS to perform one or more operations comprising:

receiving user data from one or more sources associated with the user, said user data comprising information associated with a profile configuration of the user, said profile configuration indicates a task that the user has to complete;

selecting a virtual user associated with the profile configuration of the user based on the user data, wherein the virtual user is any of a digital representation of an entity, an object, a person, a reality-based characterization, or any combination thereof; and providing the interaction between the virtual user and the user based on the user data, the virtual user sending to the user a communication regarding the task that the user has to complete.

16. The non-transitory computer-readable medium of claim 15, wherein the one or more instructions when executed by the processor further cause the VCS to perform the one or more further operations comprising:

determining a personality associated with the virtual user based on the user data.

17. The non-transitory computer-readable medium of claim 16, wherein the one or more instructions when executed by the processor further cause the VCS to perform the one or more further operations comprising:

determining an interaction type associated with the personality based on the user data.

18. The non-transitory computer-readable medium of claim 15, wherein the one or more instructions when executed by the processor further cause the VCS to perform one or more further operations comprising:

sending an update to a trusted user associated with the user based on the interaction; and sending a prompt to the user to initiate the interaction.

19. The non-transitory computer-readable medium of claim 15, wherein the one or more instructions when executed by the processor further cause the VCS to perform one or more further operations comprising:

receiving a response from the user based on the interaction; and generating one or more outputs of the interaction for communication to the user via the virtual user based on the response.

20. The non-transitory computer-readable medium of claim 15, wherein at least one of:

the virtual user is an avatar associated with a user profile, wherein the user profile is associated with the user; and wherein the interaction comprises a natural language communication based on artificial intelligence system.

\* \* \* \* \*